United States Patent [19]

St. Clair

[11] Patent Number: 4,747,343

[45] Date of Patent: May 31, 1988

[54] AUGER FOR BULK MATERIAL COMPRESSORS

[76] Inventor: Rodney D. St. Clair, Rte. 6, Box 6523, Nampa, Id. 83651

[21] Appl. No.: 95,132

[22] Filed: Sep. 11, 1987

[51] Int. Cl.$^4$ .............................................. B65G 3/04
[52] U.S. Cl. ...................................... 100/145; 100/65; 141/256
[58] Field of Search ........................ 100/65, 145, 189; 141/259, 67, 313, 256; 53/527, 576

[56] References Cited

U.S. PATENT DOCUMENTS

| | | | |
|---|---|---|---|
| 2,067,583 | 1/1937 | Stark | 100/145 X |
| 2,104,197 | 1/1938 | Johansen | 100/145 |
| 3,273,495 | 9/1966 | Ozawa | 100/145 |
| 4,655,128 | 4/1987 | St. Clair | 100/145 |

*Primary Examiner*—Andrew M. Falik
*Attorney, Agent, or Firm*—Paul F. Horton

[57] ABSTRACT

An auger for bulk material compressors of the type having a feed chamber and a packing chamber to which is attached a tubular silo bag. The auger includes an inlet portion, located within the feed chamber, and an outlet portion, located within the packing chamber. The inlet portion includes a shaft and flights, each preferably of constant diameter. The outlet portion also has flights preferably of uniform diameter and a shaft which is cone-shaped, increasing in diameter from its connection with the shaft of the inlet portion, adjacent the beginning of the packing chamber, to the end of the auger flights, within the packing chamber, for gradual compression of bulk material within the packing chamber. The terminal most end of the auger, within the packing chamber, is provided with an end member to provide a large surface area as a support bearing for the auger in its engagement with the compressed material without substantial lengthening of the shaft.

13 Claims, 1 Drawing Sheet

AUGER FOR BULK MATERIAL COMPRESSORS

BACKGROUND OF THE INVENTION

1. Field of the Invention

This invention relates, in general, to bulk material compressors for the filling of silo bags and, more particularly to an improved auger for use therewith.

2. Description of the Prior Art

Only recently have bulk material compressors been designed which include an auger which extends from a feed chamber into a packing chamber. U.S. Pat. Nos. 4,567,820 issued to F. E. Munsell and 4,655,128 issued to the inventor, R. St. Clair. Such augers are supported in part by the material being compressed within the packing chamber. Existing compressors, manufactured in accordance with the above inventions, have an auger provided with shafts and flights of constant diameter. Problems with these existing machines include a lunging or lurching motion coupled with excessive vibration during the compression process as well as uneven compression. Further, there is a braking problem in attempting to permit gradual displacement of the compressor relative to the silo bag which soon becomes immovable because of its extreme weight. The lurching motion of the compressor compounds the braking problem.

SUMMARY OF THE INVENTION

The present invention overcomes these problems found in the prior art by providing an improved auger which provides a smooth, even, filling of the silo bag without lurching of the compressor and with a lessened braking problem. The problems above recited are overcome by providing an improved auger, for bulk material compressors, having an outlet portion, located within the packing chamber, which includes a conical shaft, increasing in diameter from the auger's point of entry into the packing chamber to the end of the auger's flights, which causes gradual, rather than sudden, lateral compression of the bulk material as the conical shaft engages the bulk material; which provides progressively less cutting depth of the flights from the point of entry into the packing chamber to the end of the auger; and which also provides a large bearing surface for support of the auger in its engagement with the compressed material within the packing chamber. The auger of the present invention also includes an end member which substantially increases the bearing surface without substantial increase in length of the auger.

DETAILED DESCRIPTION OF THE INVENTION

Figure 1:
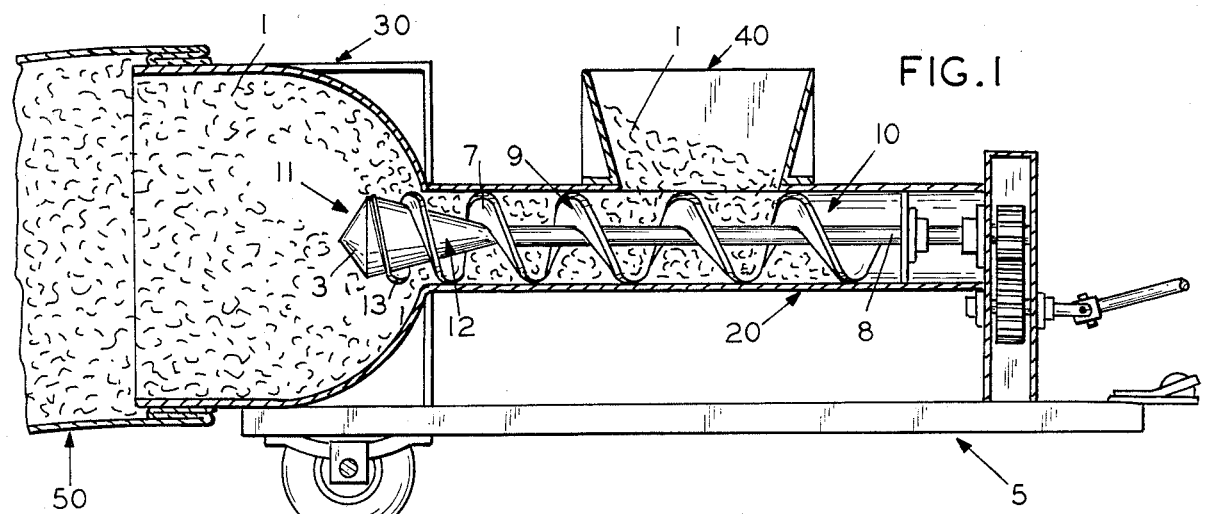
FIG. 1 is a sectional side view of the auger of the present invention, shown mounted in a bulk material compressor.
Figure 2:
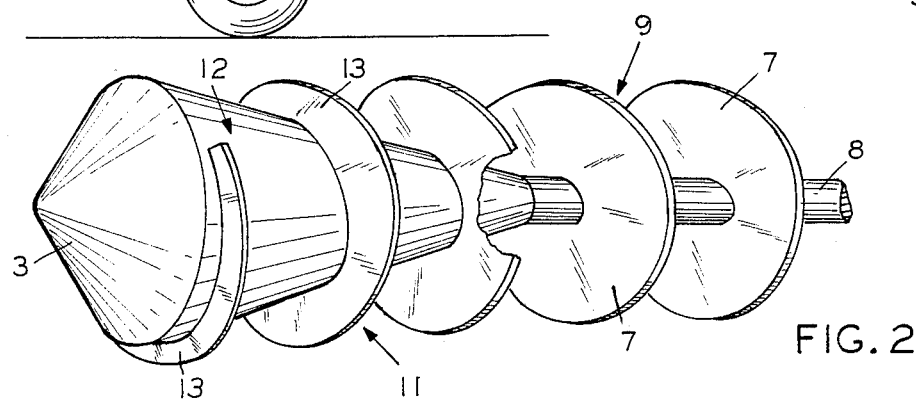
FIG. 2 is a perspective view of the auger.

Referring to the drawings and to FIGS. 1 and 2, in particular, an embodiment to be preferred of an auger 10, made according to the present invention is disclosed. As shown in FIG. 1, auger 10 is mounted in a bulk material compressor 5, having a feed chamber, designated generally by the numeral 20 and a packing chamber, designated generally by the numeral 30. The auger, upon rotation, conveys bulk material 1, such as grain, ensilage, hay, sawdust, and the like, placed into feed chamber 20 by means of hopper 40, from the feed chamber to the packing chamber 30 where it is compressed by the auger for storage in silo bag 50.

Auger 10, shown to advantage in FIG. 2, includes an inlet portion 9, located within the feed chamber 20. Inlet portion 9 includes a tubular shaft 8, preferably circular in cross section and having a constant, uniform diameter of about four inches, and one or more flights 7, also commonly called blades, which are welded or otherwise attached to the shaft. Flights 7 are also of constant diameter and are preferably twenty inches in diameter, leaving a working radius to the shaft of approximately eight inches.

Outlet portion 11 of auger 10 is provided with a conical shaft 12 which tapers from adjacent the front of the packing chamber to the rearward most terminal end of the shaft. That is, shaft 12 gradually increases in diameter from its connection to shaft 8 to its terminal end. Shaft 12 is coaxial with shaft 8, having an imaginary vertex at the axial center within shaft 8. The terminal end of conical shaft 12, which may also be considered the base of a cone, is substantially equal in diameter to flights 13 which are affixed to the shaft. Flights 13 are preferably equal in diameter to flights 7 of the inlet portion, being twenty inches in diameter. Flights 13, however, are closer together than flights 7 of the inlet portion. Otherwise stated, the pitch between adjacent flights of the outlet portion are shorter than the pitch between flights of the inlet portion 9 of auger 10.

Figure 3:
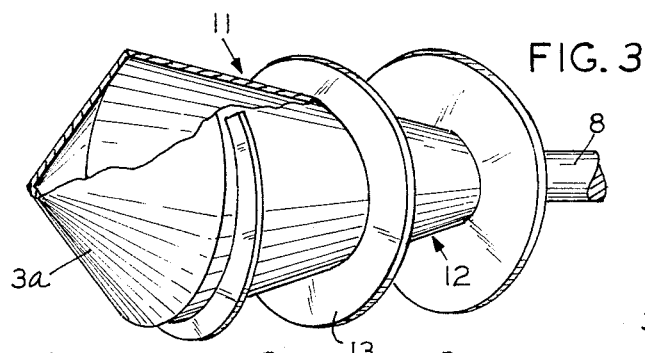
FIG. 3 is a perspective view of a first preferred embodiment of the auger end member.

Mounted on the end of the auger, also by welding or otherwise, is an end member 3, which is also coaxial with shafts 8 and 12. In the first preferred embodiment, the end member, designated as 3a, shown to advantage in FIG. 3, is conical in form and extends rearwardly of shaft 12, having a maximum diameter about its base substantially equal to the diameter of the end of shaft 12 for connection therewith. Conical end member 3a preferably has a vertex having an angle which is equal to or exceeds ninety degrees. The end member thereby provides a large surface area to serve as a support bearing for the auger in its engagement with the compressed material 1 within the packing chamber.

Figure 4:
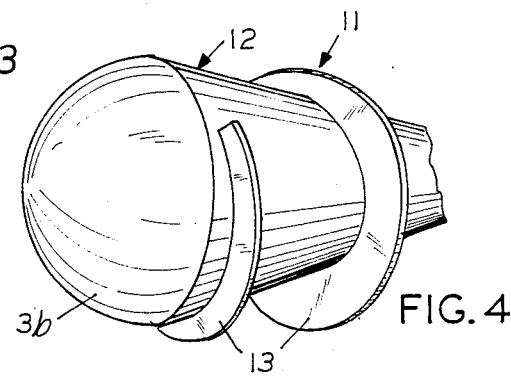
FIG. 4 is a perspective view of a second preferred embodiment of the auger end member.

Referring now to FIG. 4, a second preferred embodiment 3b of end member 3 is shown. End member 3b is convex and substantially hemispherical in construction, extending rearward of shaft 12, and provides a maximum amount of surface area. The diameter of end member 3b is also substantially equal to the end of shaft 12 for connection therewith.

Figure 5:
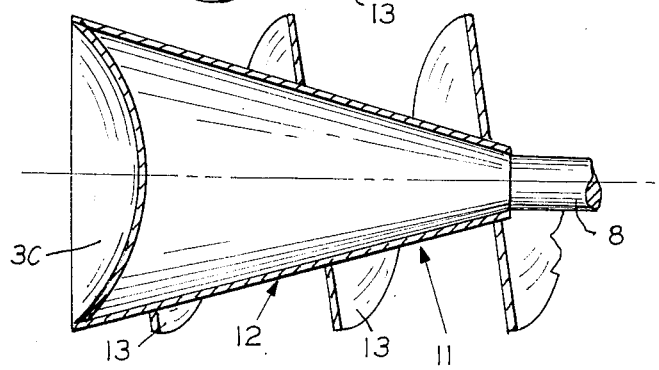
FIG. 5 is a sectional view of a third preferred embodiment of the auger end member.

FIG. 5 shows a third preferred embodiment 3c of end member 3. Member 3c is also hemispherical in construction, but is concave, thereby providing a bearing surface within shaft 12, engaging the compressed bulk material 1 as compressor 5 is pushed backward as auger 10 engages the bulk material within the silo bag.

Figure 6:
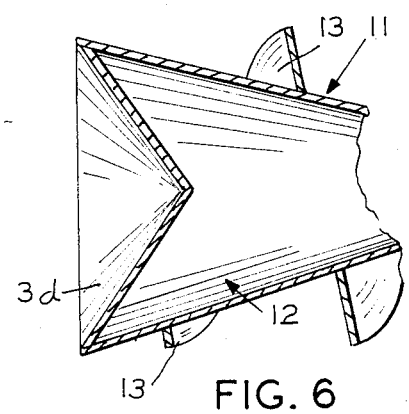
FIG. 6 is a sectional view of a fourth preferred embodiment of the auger end member.

FIG. 6 shows a fourth preferred embodiment 3d of end member 3. Member 3d is funnel shaped, ie., infundibuliform, and is also concave, extending into shaft 12. Member 3d works substantially in the same manner as end member 3c, the compressed material of the silo bag filling the concavity for support.

In operation, as auger 10 rotates, bulk material 1 is first conveyed to packing chamber 30 from feed chamber 20. As the material enters the packing chamber, conical shaft 12 of outlet portion 11 of the auger forces the material laterally in a gradual compression of the material. The compression has been found to be smooth and without lunging or lurching of the compressor. It is believed that the reason for such smooth compaction is that the conical shaft, tapering outwardly from front to rear, causes gradual rather than sudden lateral movement of the material and that the "cutting depth" of the flights 13, gradually diminishing from a radial depth of about eight inches to substantially zero at the end of the shaft, also assist by preventing sudden massive movement of the material. Additionally, conical shaft 12 also provides bearing support for the auger in its engagement with the compressed material to prevent lateral movement of the auger relative to the rest of the compressor and thereby greatly diminishes vibration. Further, the large surface area of end member 3, whether concave, convex, conical, or infundibuliform, provides further stability and support as the auger and hence machine 5 is pushed away from the compressed material within the silo bag.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A bulk material compressor of the type having a feed chamber, a packing chamber, and an auger, said auger comprising an inlet portion and an outlet portion,
    said inlet portion located within the feed chamber and including a shaft of substantially uniform diameter and one or more flights also of uniform diameter; and
    said outlet portion located within said packaging chamber and including a conical shaft and one or more flights of uniform diameter, said conical shaft connected to and coaxial with said shaft of said inlet portion and said conical shaft increasing in diameter from its connection with said inlet portion shaft to the terminal end of said flights for gradual lateral movement and compression of material located within the packing chamber.

2. The auger as described in claim 1, further comprising an end member coaxial with said conical shaft and having an outside diameter coextensive with the terminal end of said conical shaft for connection thereto for supporting said auger in said auger's engagement with compressed materials.

3. The auger as described in claim 2 wherein said end member is conical in shape and extends rearwardly from said conical shaft.

4. The auger as described in claim 3 wherein the vertex of said end member equals or exceeds ninety degrees.

5. The auger as described in claim 2 wherein said end member is convex in shape and extends rearwardly from said conical shaft.

6. The auger as described in claim 2 wherein said end member is infundibuliform in shape and extends inwardly of said conical shaft.

7. The auger as described in claim 2 wherein said end member is concave in shape and extends inwardly of said conical shaft.

8. The auger as described in claim 1 wherein said flights of said inlet portion are each substantially uniform in diameter.

9. The auger as described in claim 1 wherein said shaft of said inlet portion is substantially uniform in diameter.

10. The auger as described in claim 1 wherein said flights of said outlet portion are each substantially equal in diameter.

11. The auger as described in claim 10 wherein the end of said conical shaft is substantially equal in diameter to the diameter of the flights of said outlet portion.

12. The auger as described in claim 10 wherein said flights of said outlet portion are each substantially uniform in diameter with each of said flights of said inlet portion.

13. The auger as described in claim 12 wherein the pitch of each of said flights of said outlet portion are shorter than the pitch of respective flights of said inlet portion.

* * * * *